United States Patent [19]

Pakett

[11] Patent Number: 5,325,096
[45] Date of Patent: Jun. 28, 1994

[54] SMART BLIND SPOT SENSOR

[75] Inventor: Alan G. Pakett, San Diego, Calif.

[73] Assignee: Vorad Safety Systems, Inc., San Diego, Calif.

[21] Appl. No.: 111,826

[22] Filed: Aug. 25, 1993

Related U.S. Application Data

[63] Continuation of Ser. No. 930,079, Aug. 14, 1992, abandoned.

[51] Int. Cl.$^5$ .............................................. G01S 13/93
[52] U.S. Cl. ........................................ 342/70; 342/71
[58] Field of Search ............................. 342/70, 71, 72

[56] References Cited

U.S. PATENT DOCUMENTS

| | | | |
|---|---|---|---|
| 3,689,882 | 9/1972 | Dessailly | 342/71 X |
| 3,697,985 | 10/1972 | Faris et al. | 342/72 |
| 3,750,169 | 7/1973 | Strenglein | 342/21 |
| 3,760,415 | 9/1973 | Holmstrom et al. | 342/59 |
| 3,778,826 | 12/1973 | Flannery et al. | 342/71 |
| 3,859,660 | 1/1975 | Augustine et al. | 342/114 |
| 3,898,652 | 8/1975 | Rashid | 342/59 |
| 3,978,481 | 8/1976 | Angwin et al. | 342/59 |
| 4,072,945 | 2/1978 | Katsumata et al. | 342/70 |
| 4,349,823 | 9/1982 | Tagami et al. | 342/70 |
| 4,845,506 | 7/1989 | Shibata et al. | 342/115 |
| 4,920,520 | 4/1990 | Göbel et al. | 367/99 |
| 5,008,678 | 4/1991 | Herman | 342/158 |
| 5,087,918 | 2/1992 | May et al. | 342/85 |
| 5,115,245 | 5/1992 | Wen et al. | 342/175 |
| 5,181,038 | 1/1993 | Asbury et al. | 342/70 |

Primary Examiner—John B. Sotomayor
Attorney, Agent, or Firm—Spensley Horn Jubas & Lubitz

[57] ABSTRACT

A radar system for sensing the presence of obstacles in a vehicle's "blind spots" and generating a signal to the vehicle operator indicative of the presence of such an obstacle. The system uses a common radar transceiver that transmits a radio frequency signal directed at a blind spot of the vehicle. The signal is reflected off any obstacles that are present in that blind spot region. A Doppler shift in the received reflected frequency generally indicates that an obstacle has moved into the blind spot. Doppler frequencies attributable to objects which are of no interest, such as stationary objects, are filtered out. Only obstacles that are traveling at approximately the same speed and direction as the vehicle are considered to be of interest, and will cause the blind spot sensor to generate an indication that an obstacle is present in the blind spot. The indication is preferably an unobtrusive illuminated indicator which is affixed to one of the vehicle's mirrors. In addition to the illuminated indicator affixed to a mirror, an obtrusive audible indicator is provided in the preferred embodiment of the present invention which creates an audible tone, whistle, or buzz when an obstacle is present and the vehicle's turn signal is active.

5 Claims, 5 Drawing Sheets

SMART BLIND SPOT SENSOR

This is a continuation of application Ser. No. 07/930,079 filed on Aug. 14, 1992, now abandoned.

BACKGROUND OF THE INVENTION

1. Field of the Invention

This invention relates to automotive radar systems, and more particularly to a radar system for sensing the presence of obstacles in a vehicle's "blind spots".

2. Description of Related Art

A continuing problem that presents itself to operators of automotive vehicles is the difficulty in seeing obstacles near the vehicle but in a location that is difficult to observe from the driver's seat. Such regions are commonly referred to as "blind spots". For example, the angles between 90° and 170° from the forward direction of a vehicle (i.e., to the right of the vehicle and slightly behind the operator thereof) is a common blind spot, particularly for large vehicles such as buses and trucks. This right-side blind spot is a source of numerous accidents when a drive makes a right-hand turn or a right lane change and does not see another vehicle in the blind spot. Another common blind spot is the rear of a vehicle when backing up.

The most common solution to the problem of blind spots has been to use mirrors to aid the operator of the vehicle in determining whether obstacles are present in a blind spot. Such mirrors have been made in a variety of shapes and mounted in various locations to provide the operator with the greatest ability to detect obstacles in particular blind spots. For example, it is common place today to see a concave mirror mounted to the right side of a vehicle aimed at the right-side blind spot. While mirrors provide the operator with some information regarding the presence of obstacles in certain of a vehicle's blind spots, but they are less useful at night and under adverse weather conditions. Hence, a more complete and satisfactory solution is still sought by many.

A known alternative to the use of mirrors to detect obstacles in a vehicle's blind spot is to mount a camera on the vehicle to provide the operator with a visual image of obstacles in the vehicle's blind spot. However, this solution is complex and expensive, requiring a video camera and video monitor. Further, a video monitor can present a complex image that must be interpreted by a driver, and such monitors can be distracting. Moreover, like mirrors, such camera systems are less useful at night and under adverse weather conditions.

Therefore, there is presently a need for a simple, and inexpensive solution to the problem of detecting hazardous obstacles in the blind spots of a vehicle. Such a solution should also be useful at night and under adverse weather conditions. The present invention provides such a solution.

SUMMARY OF THE INVENTION

The present invention is a simple, compact, and inexpensive radar detection system configured to detect the presence of an obstacle in a vehicle's blind spots and generate a signal to the vehicle operator indicative of the presence of such an obstacle.

The system uses a common radar transceiver that transmits a radio frequency (RF) signal directed at a blind spot of the vehicle. The signal is reflected off any obstacles that are present in that blind spot region. The frequency of the transmitted signal is compared with the frequency of a reflection of the transmitted signal to determine whether the reflected signal has been Doppler shifted. A Doppler shift in the frequency generally indicates that an obstacle has moved into the blind spot.

Analog filters and digital circuits are used to filter out Doppler frequencies attributable to objects which are of no interest, such as stationary objects (for example, parked cars, road signs, and road side trees). Only obstacles that are traveling at approximately the same speed and direction as the vehicle are considered to be of interest. Therefore, it is only these obstacles that will cause the blind spot sensor to generate an indication that an obstacle is present in the blind spot.

The indication that is communicated to the vehicle operator is preferably an unobtrusive illuminated indicator which, in the preferred embodiment of the present invention, is affixed to or mounted near one of the vehicle's side mirrors. Having the indicator affixed in this manner allows it to be seen by a normal, practiced motion of the driver's head. However, the operator is not distracted or disturbed by the frequent indications of obstacles which may occur under normal traffic conditions, and which are of little or no interest to the operator unless a maneuver is planned which would cause the vehicle to come into contact with the obstacle. In addition to the illuminated indicator affixed to or mounted near a side mirror, an obtrusive audible indicator is provided in the preferred embodiment of the present invention which creates an audible tone, whistle, or buzz when an obstacle is present and the vehicle's turn signal is active.

A malfunction detector is also included in the inventive blind spot sensor. The malfunction detector monitors an output of a sample and hold circuit to ensure that an output voltage from the sample and hold circuit is within expected limits, thereby determining whether the system is functioning properly.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
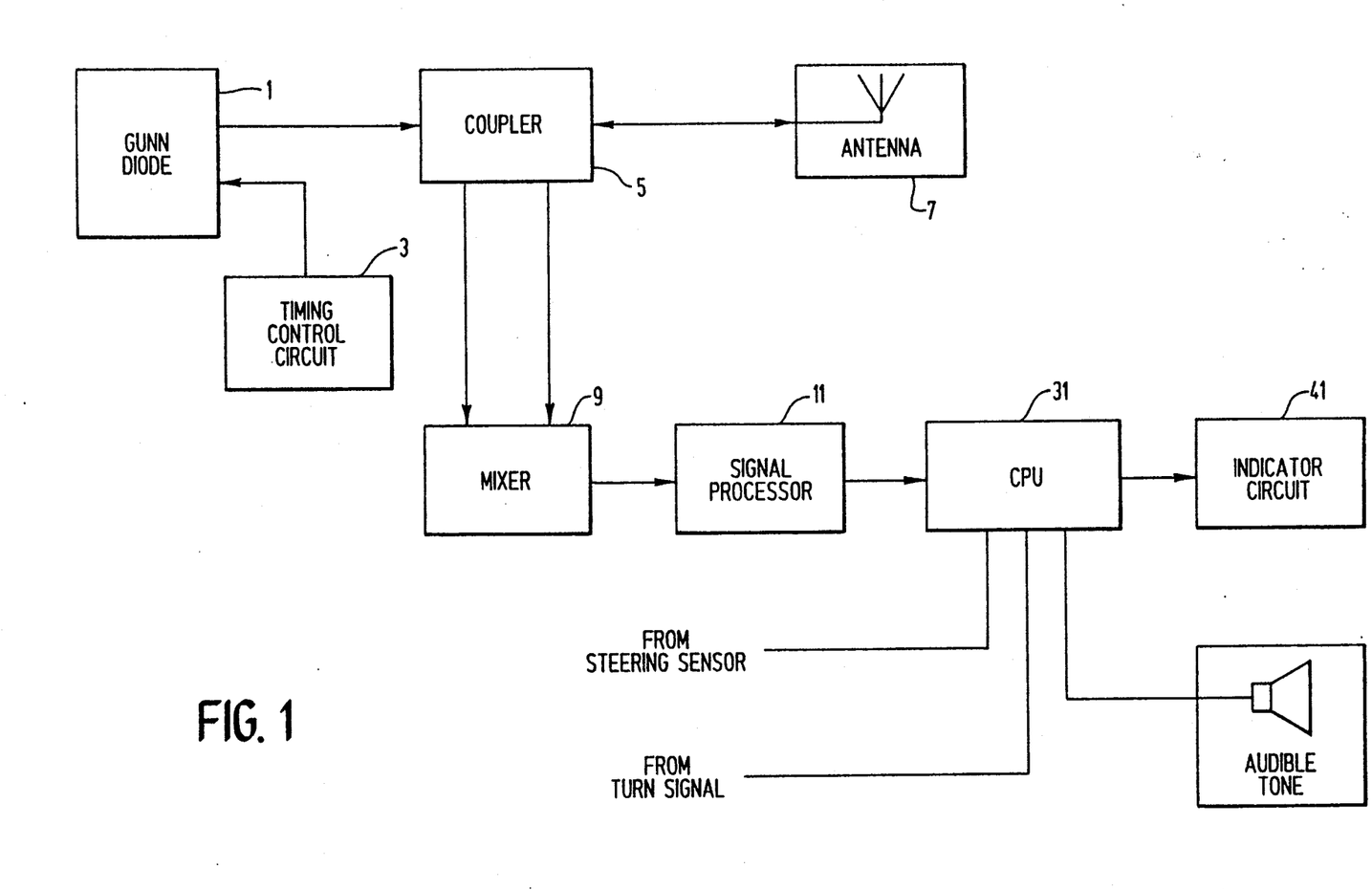
FIG. 1 is a simplified block diagram of the present invention.

FIG. 1 is a block diagram of the preferred embodiment of the present invention. The preferred embodiment shown in FIG. 1 includes a radar transceiver which determines the presence or absence of a target.

However, in an alternative embodiment of the present invention, the transceiver may emit and receive electromagnetic signals to other frequencies, or signals other than electromagnetic radiation, such as ultrasonic radiation. Such ultrasonic transceivers are well known in the art and are used for detection of objects in the context of alarm systems, for example.

In FIG. 1, a Gunn diode 1 generates an radio frequency (RF) transmit signal based upon an input provided to the Gunn diode 1 from a timing control circuit 3. The timing control circuit 3 pulses for a duration of 10 $\mu s$ at a rate of 10 kHz (i.e., the timing control signal, and consequently the RF transmit signal output by the Gunn diode 1, has a 10% duty cycle). A 10% duty cycle was chosen to optimize the energy efficiency of the system. The RF transmit signal is coupled to an RF coupler circuit 5 which permits RF energy to be coupled from the Gunn diode 1 to an antenna 7 and an RF mixer diode 9.

The antenna 7 directs the RF transmit signal along a side of a vehicle upon which the radar system is mounted. In the illustrated embodiment of the present invention, a single antenna is used to transmit a single RF signal, and is mounted to provide the most effective coverage of a blind spot of a particular vehicle. However, in an alternative embodiment of the present invention intended for use with large vehicles, such as busses, a plurality of antennas may be used to ensure that obstacles which are present anywhere within the vehicle's blind spots are detected. The RF transmit signal is reflected off obstacles in the path of the signal. The antenna 7 receives a portion of the reflected signal. If an obstacle which reflects the transmit signal is in motion relative to the antenna 7, a Doppler frequency shift occurs between the transmitted signal and the received signal. Doppler shifting is a well-known phenomenon by which a signal which is reflected off an object which is approaching the source of the signal is compressed, thereby causing the frequency of the signal to be shifted upward. Likewise, the frequency of a signal that is reflected off an object that is moving away from the source is shifted downward.

The reflections of the RF transmit signal which are received by the antenna 7 are coupled to the RF coupler circuit 5, which in turn couples the received reflections to the RF mixer diode 9. The mixer diode 9 generates an output which has a frequency equal to the difference between the frequency of the RF transmit signal and the received reflections of the RF transmit signal. In the preferred embodiment of the present invention a Doppler detection module, such as part no. DRO2980 marketed by Alpha Industries, includes the RF antenna 7, the RF coupler circuit 5, the Gunn diode 1, and the mixer diode 9 in a single housing.

The output of the mixer diode 9 is coupled to a signal processing section 11. The signal processing section 11 amplifies, time demultiplexes, and filters the output of the mixer diode 9. The signal processing section 11 is coupled to a central processing unit (CPU) 31 that determines whether the output of the signal processing section 11 represents an obstacle of interest in the blind spot. The CPU 31 is coupled to an indicator circuit 41 which presents warnings to the vehicle operator.

Figure 2:
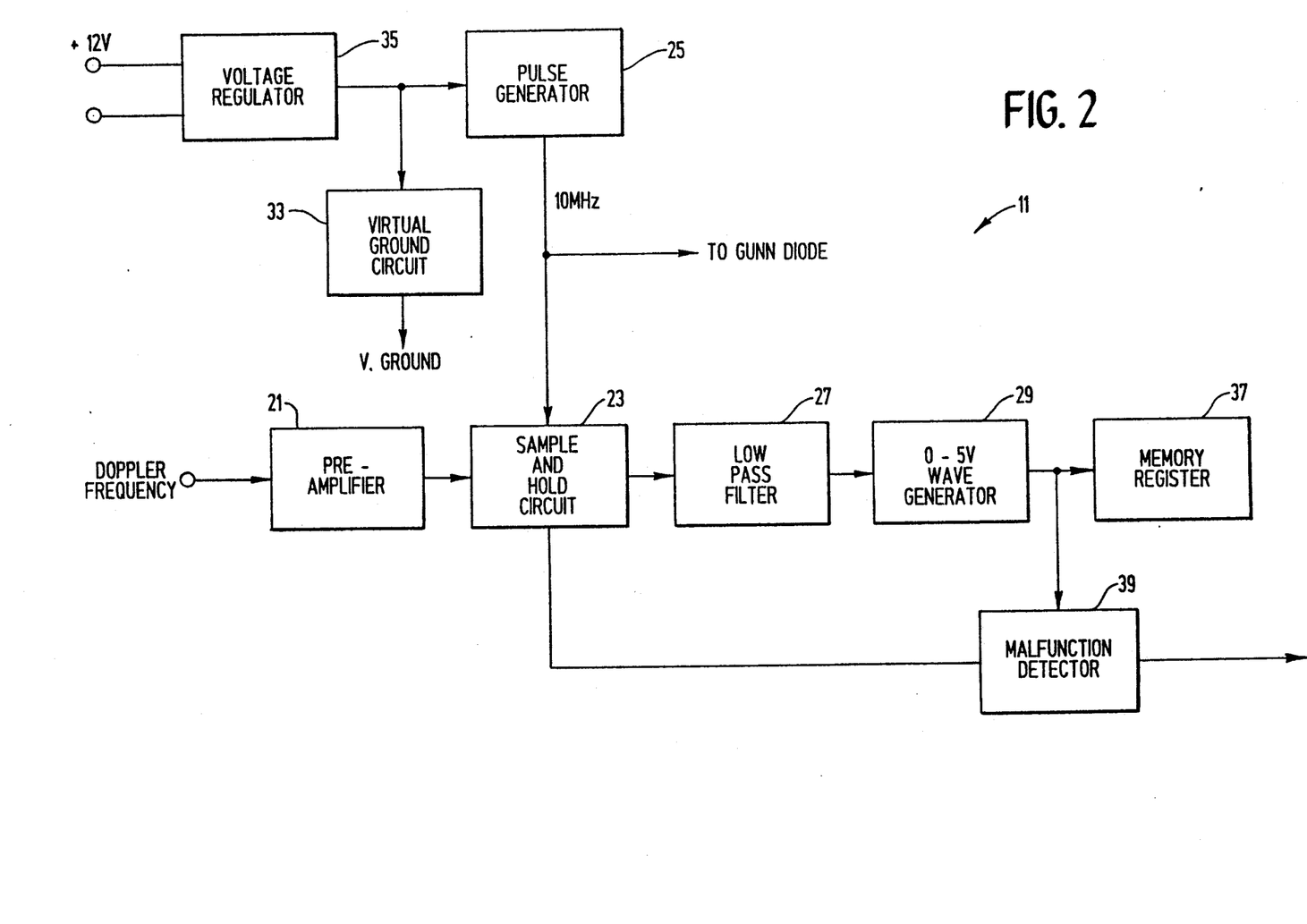
FIG. 2 is a detailed block diagram of the signal processing section of the present invention.

FIG. 2 shows a detailed diagram block of the signal processing section 11 of the preferred embodiment of the present invention. An adjustable preamplifier (preamp) 21 receives the output from the mixer diode 9. The preamp 21 has a very low frequency response of approximately $\frac{1}{2}$ Hz, thereby permitting very low frequencies to be amplified. By adjusting the gain of the preamp 21, the sensitivity of the system is set to permit only those obstacles which are in the immediate presence of the vehicle to be detected. Since the signal strength of the reflection drops by the square of the distance (i.e., $P=1/d^2$), proper adjustment of the preamp 21 is very effective in limiting the range of the blind spot sensor. For example, experimentation has shown that a motorcycle will be detected in the lane adjacent to a vehicle equipped with the present invention at a distance of approximately 3 feet, while an automobile of average size will not be detected as being present if there is an empty lane between the automobile and the radar-equipped vehicle.

In an alternative embodiment of the present invention, the distance to an obstacle can be detected and obstacles that are beyond a specified range can be disregarded. Thus, obstacles that are outside the blind spot (i.e., two lanes from the vehicle) but which are highly reflective will not cause the blind spot sensor to falsely indicate the presence of an obstacle in the blind spot. In one such alternative embodiment, a continuous wave (CW) frequency-modulated (FM) ramped modulation signal is applied to the input of the Gunn diode 9, causing the Gunn diode 9 to change frequency in a linearly proportional relationship to time for a first period. After the first period, the CW FM ramped modulation signal causes the Gunn diode 9 to change frequency in an inverse linearly proportional relationship to time for a second period, which may be equal to the first period.

Because there is a time delay between the transmission of a signal and the receipt of the reflection of that signal off an obstacle, the delay being proportional to the distance from the transceiver to the obstacle, the frequency of the received reflection differs from the transmit frequency by an amount that is proportional to the time required for the signal to travel to the obstacle and return. Therefore, the frequency is also proportional to the distance between the antenna 7 and the obstacle. Because the CW FM ramped modulation signal causes the frequency of the transmit signal to rise for a period of time and then to fall for a period of time, the frequency shift caused by the Doppler phenomenon can be distinguished from the frequency shift caused by the range of the obstacle. CW FM ramping modulation range detection schemes, such as described here, are well known in the art.

In another such alternative embodiment of the present invention, the receiver circuitry is gated off a specified amount of time after the beginning of a transmission pulse. If the specified amount of time is equal to the amount of time required for the transmit signal to reach the outer limits of the range of interest, only those obstacles that are within the range of interest are detected.

In the preferred embodiment of the present invention, the output of the preamp 21 is coupled to a sample and hold circuit 23. The sample and hold circuit 23 samples the output of the preamp 21 at a rate and for a duration equal to the rate and duration at which the transmit signal is pulsed by the Gunn diode 1 (i.e., for 10 $\mu s$ at a rate of 10 kHz in the preferred embodiment). The sampling is synchronized to the transmission of the transmit signal by applying the same synchronization signal from a pulse generator circuit 25 to both the Gunn diode 1 and the sample and hold circuit 23. The synchronization signal causes the Gunn diode 1 to generate the transmit signal when the synchronization signal is at a relatively high voltage level, and also gates the sample and hold circuit 23 to sample the output of the preamp 21 during the same period. Each time the sample and hold circuit 23 samples the output of the preamp 21, a voltage level is recorded. Thus, the output of the sample and hold circuit 23 is a series of voltage levels which increment or decrement every 100 μs. The voltage levels represent the phase difference (i.e., Doppler shift) between the transmit signal and the received signal applied to the mixer diode 9 during each sample period.

The output of the sample and hold circuit 23 is coupled to a low pass filter 27. The low pass filter 27 of the preferred embodiment of the present invention has a 3 dB cutoff frequency of about 100 Hz. The low pass filter 27 serves three purposes: 1) to smooth the signal output by the sample and hold circuit 23 by removing high-frequency components of the output waveform; 2) to reduce noise, thus improving sensitivity without increasing RF power; and 3) to eliminate signals which represent objects moving rapidly relative to the vehicle, including stationary objects. Since the purpose of the present invention is to determine whether an obstacle which would otherwise go undetected by the operator is present in a blind spot of the vehicle, those obstacles which move rapidly through the blind spot are not of interest. It is assumed that obstacles that are moving rapidly through one of the vehicle's blind spots will be seen before entering the blind spot, or will pass through the blind spot before the operator causes the vehicle to perform a maneuver which would present a danger due to the presence of that obstacle.

The low pass filter 27 is coupled to a square wave generator 29 which generates a square wave signal that alternates between 0 volts and 5 volts. The frequency of the signal output by the square wave generator 29 is determined by the frequency of the input to the square wave generator 29 from the low pass filter 27. A square wave transition is output by the square wave generator 29 whenever an obstacle has been detected.

In the preferred embodiment of the present invention, the square wave generator 29 is a comparator circuit with hysteresis. The hysteresis provides noise immunity, prevents the comparator from oscillating, and limits range detection to a defined distance. Thus, when the input to the square wave generator 29 rises to cross a first relatively high threshold, the output of the square wave generator 29 transitions to a 5 volt level. When the input to the square wave generator 29 falls below a second relatively low threshold, the output of the square wave generator 29 transitions to a 0 volt level. The creation of a square wave output provides noise immunity and allows the output to be further processed by the CPU 31.

Because some of the circuitry used in the present invention operates more efficiently when power is supplied from a bipolar power supply (i.e., both positive and negative voltages), a virtual ground circuit 33 is included in the illustrated embodiment of the present invention. The virtual ground circuit 33 works in conjunction with a voltage regulator 35 to supply the power requirements of the illustrated embodiment of the present invention. Most automotive vehicles today include a 12 volt battery which powers the starter motor and the electrical system when the engine of the vehicle is not operating, and a voltage generator or alternator which recharges the battery and supplies current to the vehicle electrical system when the engine is operating. The voltage regulator 35 of the present invention receives power from the 12 volt vehicle power source and generates a stable 5 volt output. The 5 volt output of the voltage regulator 35 is applied to those components of the present invention which operate from a positive 5 volt source, and to the virtual ground circuit 33. The virtual ground circuit 33 creates a 2.5 volt output which acts as a virtual ground reference for those components within the present invention that require both positive and negative supply voltages. Thus, the 5 volt output of the voltage regulator 35 is 2.5 volts positive with respect to the virtual ground reference, and earth ground (0 volts) is 2.5 volts negative with respect to the virtual ground reference. Such virtual ground circuits are well known in the art.

A malfunction detector circuit 39 is coupled to both the sample and hold circuit 23 and the square wave generator 29. The malfunction detector circuit 39 generates an output that indicates whether the present invention is operating properly. When the present invention is operating properly, a direct current (DC) offset is present at the analog output of the sample and hold circuit 23. The DC offset is stripped from the analog output by capacitively coupling the analog output from the sample and hold circuit 23 to the low pass filter 27. However, the DC portion of the output of the sample and hold circuit 23 is present in the output that is coupled to the malfunction detector 39. In the preferred embodiment of the present invention, if the DC offset is not above a specified voltage, the malfunction detector 39 generates and sends a gate control signal to the square wave generator 29 which decouples the square wave generator 29 from output circuitry of the signal processing section 11. A voltage divider circuit coupled to the signal processing section 11 output causes the output of the signal processing section 11 to be 2.5 volts. Since, under normal conditions, the square wave generator 29 outputs only 0 volts or 5 volts, the presence of a 2.5 volt output from the square wave generator 29 indicates a problem.

The output of the square wave generator 29 is coupled to a dual edge-triggered memory register (flip-flop) 37, which is used to establish a "persistence period", as described below. A "persistence period" is defined in the preferred embodiment as the amount of time that it takes the vehicle upon which the radar system in mounted to travel 15 feet. When an obstacle is first detected, as determined by a transition at the output of the square wave generator 29, the CPU 31 waits the persistence period before responding to additional transitions. During the persistence period, no warnings are sent to the driver indicators. After the end of the persistence period, a warning is sent after each such transition if the transition occurs either within one second after the end of the last persistence period or two seconds after a prior warning was sent. Otherwise, a new persistence period cycle begins.

If it is determined that an obstacle persists in the blind spot, a indication is presented to the operator of the vehicle. In the preferred embodiment of the present invention, three types of indications are used. If the vehicle's turn signal becomes active (as detected by a position sensor coupled to an input of the CPU 31), and an obstacle is detected in the blind spot, an audible alarm sounds (e.g., emits an audible tone, whistle, or buzz) and a red visual indicator illuminates. If the turn signal is not active and an obstacle is detected in the blind spot, the audible alarm is not activated, but the red visual indicator illuminates. If no obstacle is detected, a yellow visual indicator illuminates and the red indicator is inactive (illumination of the yellow indicator signifies that the blind spot sensor and circuit are active.)

In an alternative embodiment of the present invention, sensors to detect the steering wheel position and/or the position of the turn signal are used to provide an indication that the operator is attempting to turn or change lanes. Other sensors may also be used to aid in the determination as to when the operator is attempting to cause the vehicle to enter a blind spot region. The system can be configured, if desired, to detect turning indicated by the position of the turn signal and/or by sensing the position and movement of the steering wheel, and to activate the audible alarm only if a turn is indicated in the direction of a blind spot in which an obstacle is present.

Figure 3A:
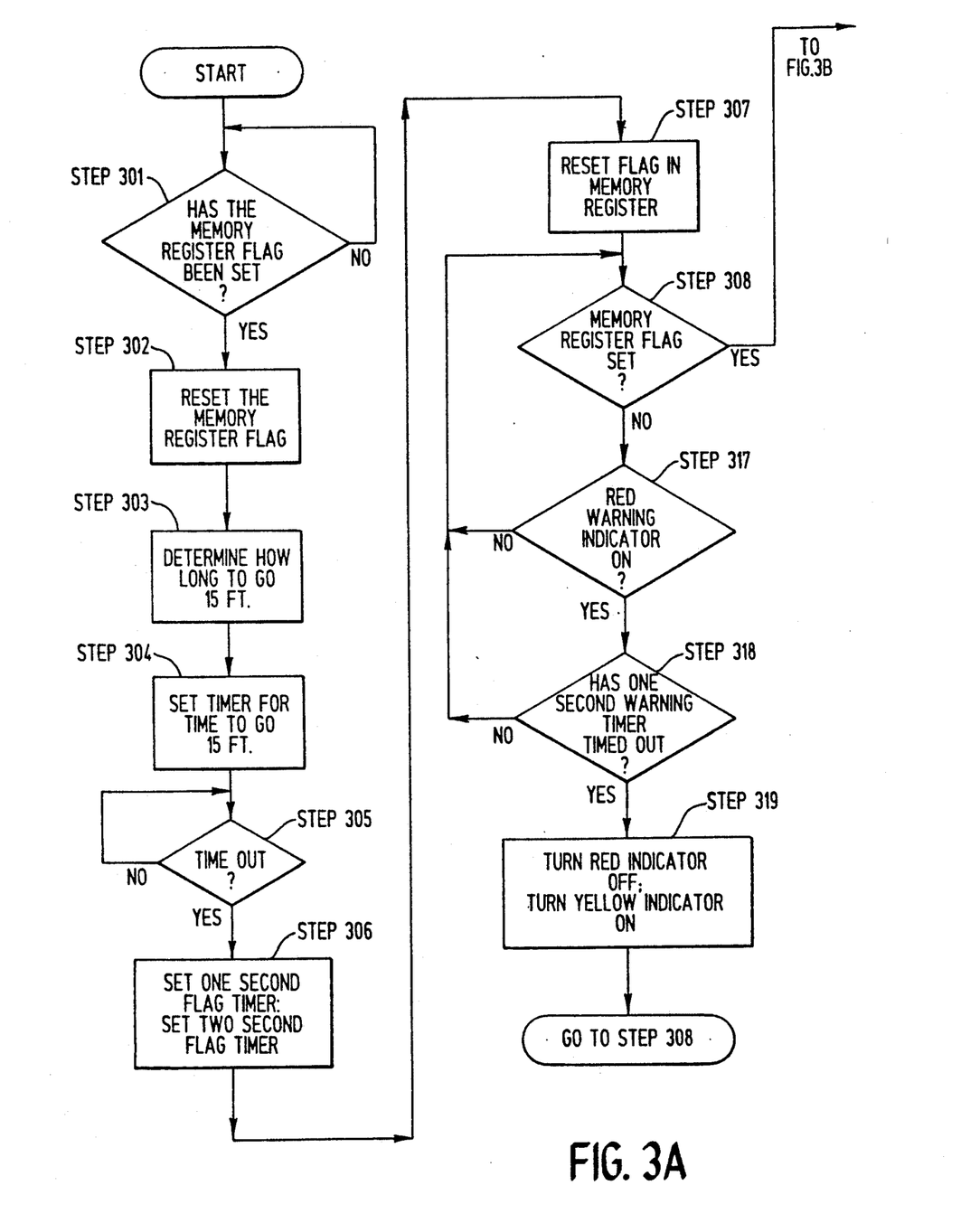
FIGS. 3a and 3b are flow charts of the procedure followed by the preferred embodiment of the present invention upon detection of an obstacle.
Figure 3B:
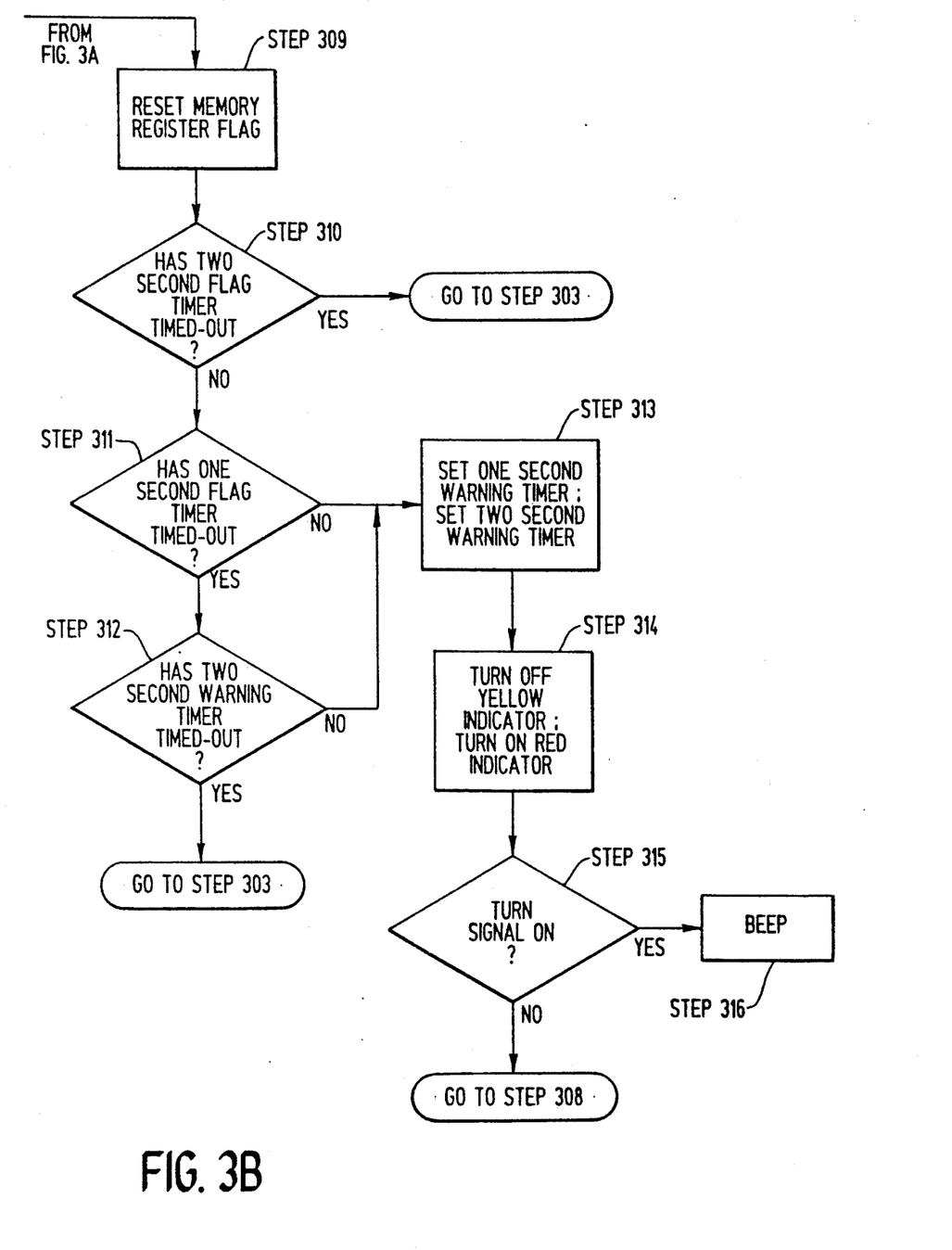

FIG. 3 is a flow chart of the procedure followed by the preferred embodiment of the present invention for determining whether to warn the vehicle's operator of the presence of an obstacle in a monitored blind spot. When a transition from 0 volts to 5 volts or from 5 volts to 0 volts occurs, a flag within the register 37 is set. In the illustrated embodiment of the present invention, the CPU 31 polls the register 37 at regular intervals to determine whether the register 37 has been set (STEP 301). (In an alternative embodiment of the present invention, the CPU 31 is interrupted when the flag within the register 37 is set.) Once the CPU 31 detects that the flag within the register 37 has been set, the CPU 31 resets the flag (STEP 302) and ceases polling the register 37. The CPU 31 is coupled to a speedometer which measures the ground speed of the vehicle. The CPU 31 uses the vehicle speed to calculate how long it will take the vehicle to travel 15 feet (i.e., the persistence period) (STEP 303), and sets a timer to "time-out" at the end of the calculated amount of time (STEP 304). Once the timer times out (STEP 305), the CPU 31 sets a one second and a two second flag timer (STEP 306), and resets the flag in register 37 to ensure that any new transitions that may have occurred during the persistence period are cleared (STEP 307).

In an alternative embodiment of the present invention, one timer is used to indicate the amount of time elapsed after the flag in the register 37 is reset. Thus, the same timer which was used to determine when the persistence period has elapsed is reset and can be read at any time to determine the amount of time elapsed since the flag in the register 37 was reset.

The timers of the preferred embodiment of the present invention are integrated into the CPU 31. However, one or more of the timers may be implemented in external circuitry.

In the illustrated embodiment of the invention, the CPU 31 once again begins polling the flag within the register 37 after the persistence timer has timed out (STEP 308). By suspending the polling of the register 37 for the persistence period, and resetting the register 37 at the end thereof, the system effectively ignores transitions at the output of the square wave generator 29 caused by reflections of the RF transmit signal off stationary obstacles, such as parked cars and road signs, which are present in the blind spot for less than the persistence period.

The CPU 31 checks whether a warning is presently being displayed (i.e., in the preferred embodiment of the present invention, whether the red indicator is illuminated) (STEP 317) while waiting for the flag in the register 37 to be set. If a warning is presently being displayed, the CPU 31 determines how long it has been since the warning was last activated. If the warning has been on display for more than one second without being reactivated (STEP 318), the CPU 31 causes the warning to cease being displayed (STEP 319). The CPU 31 also determines whether an audible alarm has been sounding for more than one second without being reactivated (STEP 320), and causes the audible alarm to cease if reactivation of the alarm has not occurred in the last one second (STEP 321).

If the CPU 31 determines that the flag in the register 37 is set (STEP 308), the CPU 31 resets the flag (STEP 309) and checks how long it has been since the persistence timer timed-out (STEP 310). If more than two seconds have passed since the persistence timer timed-out, the process returns to STEP 303 and suspends the polling of the register 37 once again. Thus, if an obstacle reflects the RF transmit signal back to the antenna 7, causing the output of the square wave generator 29 to transition, but no further reflections are detected for over two seconds, the system behaves as if the next transition of the square wave generator 29 is unrelated to the last transition, i.e., polling is suspended to ensure that the obstacle that caused the transition persists for more than the time required to travel 15 feet.

However, if the transition has occurred within two seconds of the time-out of the persistence timer (i.e., the two-second persistence timer has not timed-out), then the CPU 31 checks whether one second has elapsed between the end of the persistence period and the latest transition (STEP 311). If more than one second has elapsed, then the CPU 31 checks whether more than 2 seconds have elapsed since the last warning has been reactivated (STEP 312). If more than two seconds have elapsed, then the system returns to STEP 303 and suspends polling of the flag in the register 37 for the duration of a newly calculated persistence period. Otherwise, a one second warning timer and a two second warning timer are set (STEP 313), and the warning is reactivated (i.e., in the preferred embodiment of the present invention, the yellow indicator is turned off and the red indicator is turned on) (STEP 314). It should be understood that, as with the flag timers of step 306, the warning timers may be implemented as a single timer and may be either discrete timers or integrated into the CPU 31.

In the preferred embodiment of the present invention, the CPU 31 determines whether the vehicle turn signal is active (STEP 315). If so, an audible alarm is activated to indicate that an obstacle is present in the blind spot and that turning the vehicle may be hazardous (STEP 316). After reactivating the warning and resetting the warning timer, the system returns to STEP 308 to await the next setting of the flag in the register 37.

By determining whether a warning has been activated within the last two seconds, and if so, then extending the period before which the system resets the persistence timer, an obstacle in the blind spot which is moving at a very slow speed relative to the vehicle is not filtered out of the system due to the long duration between transitions of the square wave generator 29 output. For example, an obstacle in the blind spot moving at a relative speed that produces a Doppler frequency of less than $\frac{1}{2}$ Hz generates transitions at the output of the square wave generator 29 at twice the Doppler frequency, i.e., less than 1 Hz. Therefore, the time between transitions is greater than 1 second. Increasing the amount of time allowed between the time-out of the persistence timer in STEP 305 and the next occurrence of a transition (as determined by detecting that the flag in the register 37 has been set) increases the low frequency response of the system. If it is already determined that an obstacle was very recently present (i.e., the warning timer has not yet timed-out), then the possibility that an obstacle of interest caused the transition is much greater.

Figure 4:
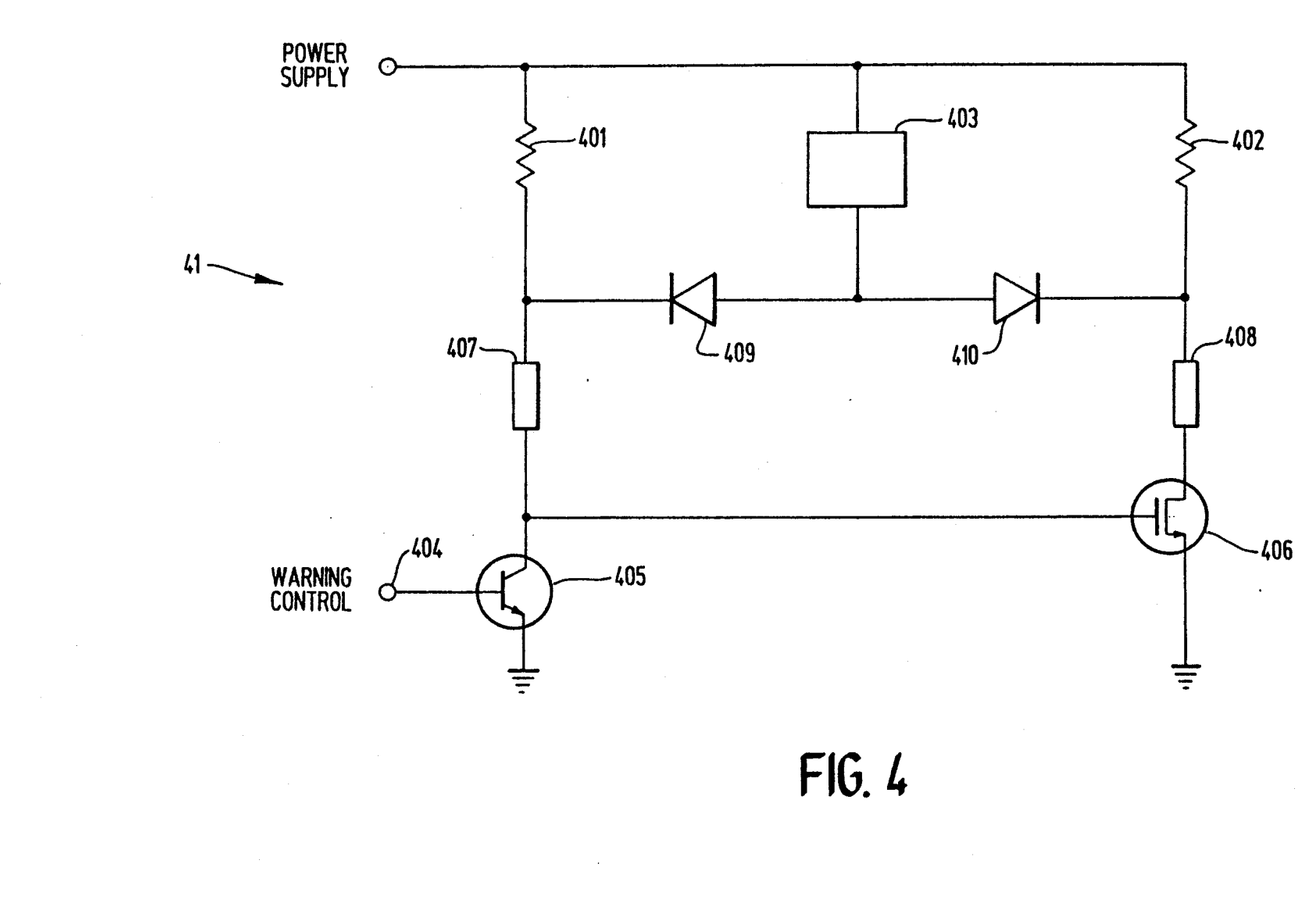
FIG. 4 is a simplified schematic of the indicator circuit of the preferred embodiment of the present invention.

FIG. 4 is a simplified schematic of a preferred indicator circuit 41 for controlling the illumination of two warning indicators 407, 408, one of which would be yellow and the other red. A power supply is coupled to two resistors 401, 402 and a photo switch 403. A warning control input 404 coupled to a control output of the CPU 31 controls the conductivity of a bipolar transistor 405, which in turn controls the conductivity of a field effect transistor (FET) 406. By controlling the bipolar transistor 405 and the FET 406, the warning control input 404 controls the current flow through the two warning indicators 407, 408. The photo switch 403 is capable of bypassing the current limiting resistors 401 and 402, and thus increasing the luminance of each of the warning indicators 407, 408. The photo switch 403 is turned on (i.e., conducts current) when the ambient light is greater than a predetermined threshold amount. Therefore, the luminance is automatically controlled as a function of the ambient light, such that the warning indicators 407, 408 are visible in full sunlight, and are dimmed for nighttime conditions. Diodes 409, 410 divide the current that passes through the photo switch 403 when the photo switch is conducting, while isolating the current that flows through the resistors 401, 402 and indicators 407, 408 when the photo switch is not conducting.

In the preferred embodiment of the present invention, the visual warning indicators 407, 408 are very high luminance light emitting diodes (LEDs) placed on or in close proximity to a mirror on the same side of the vehicle as the blind spot sensor, such that when the operator looks in the mirror the warning indicators 407, 408 are prominent. Having the warning indicators 407, 408 affixed to an existing mirror allows it to be seen by a normal, practiced motion of the driver's head. However, the operator is not distracted or disturbed by the frequent indications of obstacles which may occur under normal traffic conditions, and which are of little or no interest to the operator unless a maneuver is planned which would cause the vehicle to come into contact with the obstacle.

The present invention thus provides a simple, inexpensive, and complete solution to the problem of detecting hazardous obstacles in the blind spots of a vehicle. In addition, because the system generates and senses its own electromagnetic waves, the present invention works at night and under most adverse weather conditions. Reflected signals attributable to objects which are of no interest, such as stationary objects, or which do not persist a minimum amount of time, are ignored. Only persistent obstacles that are traveling at approximately the same speed and direction as the vehicle are considered to be of interest, and will cause the blind spot sensor to generate an indication that an obstacle is present in the blind spot. In the preferred embodiment, the indicators give a first, non-obtrusive indication to signify that the blind spot sensor is active, a second, somewhat obtrusive indication to signify that a persistent obstacle is present in the blind spot, and a third, more obtrusive indication to signify that a persistent obstacle is present in the blind spot if the driver has activated the turn indicator.

While a number of embodiments of the present invention have been described, it will be understood that various modifications may be made without departing from the spirit and scope of the invention. For example, the transceiver may transmit and receive ultrasonic radiation. Also, the RF transmit frequency may be a multiple frequency signal having a multitude of frequencies, each frequency being time division multiplexed with the others. Furthermore, the RF transmit frequency may be a continuous wave signal. Additionally, the RF transmit signal may be a pseudo-pulse signal in which the Gunn diode 9 is not turned completely off, but rather alternates between two discrete power levels. Still further, a wide variety of mechanisms or methods can be used for warning the vehicle operator of the presence of an obstacle, such as bells, physical vibrations, visual indications placed on the dashboard or windshield, and/or use of a mirror incorporating a material (e.g., lead lanthanum zirconate titanate, or PLZT) which changes color (i.e., turns red) or otherwise changes optical properties when the smart blind spot sensor detects an obstacle in the blind spot. Moreover, the smart blind spot sensor can use multiple Doppler detection modules to provide coverage of multiple blind spots. In such a configuration, a single CPU 31 can be used to poll and control all of the modules, thus reducing the cost of such a system by time-sharing the CPU 31 between the multiple modules. Still further, the values disclosed above for the persistence periods, time-out periods, duty-cycle, etc., may be varied as desired, and are not limited to the particular values disclosed.

Accordingly, it is to be understood that the invention is not to be limited by the specific illustrated embodiment, but only by the scope of the appended claims.

I claim:

1. A system for detecting the presence of targets moving at slow speeds relative to the vehicle upon which the system is mounted and adjacent to, and on at least one side of, the vehicle upon which the system is mounted, including:
    (a) a transceiver for emitting signals along side a vehicle upon which the system is mounted and for receiving reflections of the emitted signals;
    (b) a Doppler circuit, coupled to the transceiver, for generating a Doppler signal having a frequency equal to the difference between the emitted signal and the received reflections;
    (c) a signal processing section including:
        (1) an amplifier, coupled to the Doppler circuit, for amplifying the Doppler signal such that only targets within a range of approximately 15 feet of the transceiver are detected;
        (2) a sample and hold circuit, coupled to the amplifier, for sampling the output of the amplifier during periods concurrent with the emission of the emitted signals and generating a signal having a voltage level that is proportional to the phase difference between the emitted signal and received reflections;
        (3) a low pass filter, coupled to the output of the sample and hold circuit, for filtering high frequency components and signals which represent objects moving rapidly relative to the vehicle upon which the system is mounted from the signal output by the sample and hold circuit;

(4) square wave generator coupled to the low pass filter for generating a square wave output having a frequency equal to the filtered signal;

(5) malfunction detector circuit, coupled to the output of the square wave generator and the output of the sample and hold circuit, for sensing the level of the direct current offset of the signal generated by the sample and hold circuit, to determine when the system is operating within specified limits, and indicating a malfunction in the detection system when the system is not operating within the specified limits;

(6) a persistence period circuit, coupled to the square wave generator, for generating an output equivalent to the output of the square wave generator when an object is present for a predefined minimum persistence period;

(d) an indicator circuit, coupled to the persistence period circuit, for receiving the output of the persistence circuit and indicating to an operator of the vehicle on which the system is mounted, the presence of an object which is detected for a period which is longer than the persistence period.

2. The system of claim 1, wherein the malfunction detector circuit is coupled to the indicator circuit for indicating to an operator of the vehicle on which the system is mounted when the system is operating within specified limits.

3. The system of claim 1, wherein:
(a) the indicator circuit is coupled to at least one automotive turn signal;
(b) the indication of the presence of an object is by means of a visual indicator; and
(c) an audible alarm to the operator, in addition to the visual indication, is presented to the operator when an object is detected on the side of the vehicle to which the turn signal signals a turn.

4. The system of claim 1, wherein the low pass filter has a 3 decibel cutoff at approximately 100 Hertz.

5. A system for detecting the presence of objects moving at relatively slow speeds adjacent to, and on at least one side of, a vehicle upon which the system is mounted, including:
(a) a transceiver for emitting signals along side a vehicle upon which the system is mounted and for receiving reflections of the emitted signals;
(b) a Doppler circuit, coupled to the transceiver, for generating a Doppler signal having a frequency equal to the difference between the transmitted signal and the received signal;
(c) signal processing section for:
  (1) setting the gain of the Doppler signal such that only targets within a range of approximately 15 feet of the transceiver are detected;
  (2) sampling the Doppler signal during periods concurrent with the emission of the emitted signals and generating a voltage level proportional to the phase difference between the emitted and received signals;
  (3) removing high frequency components and signals which represent objects moving rapidly relative to the vehicle upon which the system is mounted from the sampled Doppler signal;
  (4) sensing the level of the direct current offset of the signal sampled Doppler signal to determine when the system is operating within specified limits;
  (5) preventing the output of the square wave generator from causing an indication that an object is present for a predefined minimum persistence period;
(d) an indicator circuit, coupled to the persistence period circuit and to the signal conditioning circuit, for indicating to the operator that the system is operating within specified limits, and indicating the presence of an object which is detected for a period which is longer than the persistence period.

* * * * *

UNITED STATES PATENT AND TRADEMARK OFFICE
CERTIFICATE OF CORRECTION

PATENT NO.   :   5,325,096
DATED        :   June 28, 1994
INVENTOR(S)  :   Allan G. Pakett It is certified that error appears in the above-indentified patent and that said Letters Patent is hereby corrected as shown below:

Title page, item [75]:

Change "Alan" to --Allan--.

Signed and Sealed this

Eighth Day of November, 1994

Attest:

BRUCE LEHMAN

Attesting Officer    Commissioner of Patents and Trademarks